Patented Aug. 26, 1941

2,253,614

UNITED STATES PATENT OFFICE 2,253,614

GELATIN MILK DESSERT COMPOSITION AND METHOD OF PREPARING THE SAME

Chester H. Epstein, Highland Park, and Nathan R. Gotthoffer, Grayslake, Ill., assignors to Grayslake Gelatin Co., Grayslake, Ill., a corporation No Drawing. Application September 12, 1938, Serial No. 229,525

4 Claims. (Cl. 99—130)

This invention relates to a gelatin dessert composition and to a method of preparing the same. More particularly it deals with a composition formulated specifically so that a product of good character can be obtained when milk is used as the major portion of the dissolving liquid. At the same time a novel method of preparing the dessert is revealed which overcomes the disadvantages usually attendant on gelatinated milk dishes.

Gelatin dessert compositions are old and well known commercially. They consist essentially of a mixture of sugar, gelatin, fruit acid, flavor and color and are produced by simply mechanically mixing the ingredients in the requisite proportions. The mixture is then packaged, usually 3¼ ounces per package, and is made up into the dessert by dissolving in water, one pint of water being employed for the 3¼ ounce package, molding and congealing by cooling. A typical package would thus consist of:

| | Grams |
|---|---|
| Sugar | 80 |
| Gelatin | 9 |
| Fruit acid (citric or tartaric usually) | 1.75 |
| Flavor and color as desired. | |

This composition, while admirably suited to the preparation of a gelatin dessert with water, cannot be employed with milk as the dissolving fluid. When milk is used instead of water with the above ingredients, bad curdling of the milk takes place and, furthermore, the flavor of the ensuing product is unsatisfactory and of poor character. Industry has long felt the need of a satisfactory fruit flavored milk dessert and it is this want that our invention satisfies.

We have found that the following proportion of ingredients is excellently suited to the formation of a fruit-flavored dessert with milk as the chief liquid agent:

| | Grams |
|---|---|
| Sugar | 48 |
| Gelatin | 7 |
| Citric acid | 0.2 |
| Salt | 0.2 |
| Flavor and color as desired. | |

We have found, further, that by utilizing a novel method of preparation, herein described, the product can be readily prepared to yield a smooth, homogeneous dessert of good flavor and excellent consistency. The method of preparation consists in dissolving the ingredients in a relatively small portion of water first and then mixing the aqueous solution with cold milk. In this manner, the thick skin which is usually present on the surface of milk puddings, especially where heated milk is employed, is entirely eliminated and the product is smooth and homogeneous throughout. At the same time ready solubility of the mixture is obtained by following the above procedure, and the addition of the cold milk enables the finished dessert to be ready for consumption in only a few hours after preparation. Thus, in connection with the ingredients listed above, ¼ (one-fourth) pint of hot water would be used for dissolving the mixture and then ¾ (three-fourths) pint of cold milk would be mixed with the solution.

One great advantage of this invention lies in the fact that it offers a novel means of increasing the consumption of milk, a food which, it has been shown, is not adequately consumed in the United States. In addition to the benefits to be derived from the increased consumption of milk, the nutritional status of the individual will be further benefited by the use of gelatin, since it has been revealed that gelatin serves to increase the digestibility of milk and that it has a definite place in the dietary. Further, the invention described above is important in that it encourages the consumption of milk, since it provides it in a novel form and pleasant manner to children and others who do not normally consume milk because of a personal dislike of the same. Finally, recent researches have also shown that the addition of small quantities of acid likewise aid in the digestion of milk.

While the values given above constitute the preferred form of our invention, we do not limit ourselves to the specific ingredients or values set forth but may vary these within limits. Obviously, the amount of gelatin employed will depend on the strength of the gelatin and thus may vary over a considerable range. It will be found, however, that usually approximately 15% less gelatin can be employed in our composition than in a corresponding gelatin dessert composition, the former being made up with ¼ pint water and ¾ pint milk as described above and the latter with 1 pint water. The sugar also may be varied within limits depending on the sweetness desired and on the other ingredients employed. Acid may be employed to as high as 0.8 gram per package and salt may be increased or decreased or even entirely eliminated if desired. The formula above given may vary within the following limits: sugar 25 to 75 parts, gelatin 6 to 10 parts, citric acid 0.1 to 0.8 part, salt 0.0 to 0.5 part, with flavor and color. The amount of hot water employed to dissolve the dry compositions should be relatively small. Preferably the ratio of water to cold milk added later should be of the order of 1 to 3 and the total liquid added should be within the setting or jellying limits of the resultant mixture.

Tartaric or malic acid may also be substituted for the citric acid, and buffer salts, such as sodium citrate, may be added if desired.

As a further modification of our invention it is possible to add powdered whole milk or powdered skim milk to the ingredients and we consider such additions as coming within the scope of our invention.

What we claim as new and desire to secure by United States Letters Patent is:

1. A milk-gelatin dessert preparing material in dry form comprising as the necessary ingredients sugar 25 to 75 parts, gelatin 6 to 10 parts, citric acid 0.1 to 0.8 part and salt 0.0 to 0.5 part with flavor and color, said material being capable of liquefaction with approximately ¼ pint of hot water to 55 grams of the dry material and dilution of the resultant liquid with approximately ¾ pint of cold whole milk and setting with a uniform consistency, free of curds or skin and being of good flavor.

2. The method of preparing a milk-gelatin dessert which comprises dissolving the dry material of claim 1 in a relatively small amount of hot water, mixing the resultant solution with cold whole milk and allowing the mixture to set, the ratio of water to milk being of the order of 1 to 3 and the total milk being within the permissible setting limits of the mixture.

3. The method of preparing a milk gelatin dessert which comprises dissolving a dry material comprising as the essential ingredients:

|  | Parts |
| --- | --- |
| Sugar | 25 to 75 |
| Gelatin | 6 to 10 |
| Fruit acid | 0.1 to 0.8 |
| Salt | 0.0 to 0.5 | and containing flavor and coloring matter to taste, in a relatively small quantity of hot water, mixing the resultant solution with cold whole milk and allowing the mixture to set, the ratio of water to milk being of the order of 1 to 3, and the total added liquid being within the permissible setting limits of the mixture.

4. A milk-gelatin dessert preparing material in dry form, comprising sugar 48 parts, gelatin 7 parts, citric acid 0.2 part, salt 0.2 part, with flavor and color, said material being capable of liquefaction by water and heat, dilution with whole milk, cold, and setting with a uniform consistency, free of curds.

CHESTER H. EPSTEIN.
NATHAN R. GOTTHOFFER.